May 2, 1967

G. PRISLAN 3,317,300

ANGULAR JETS IN CONDITIONING CHAMBER OF A
GLASS SHEET DRAWING APPARATUS

Filed Sept. 12, 1963

INVENTOR
GEORGES PRISLAN
By Irwin S. Thompson
ATTY.

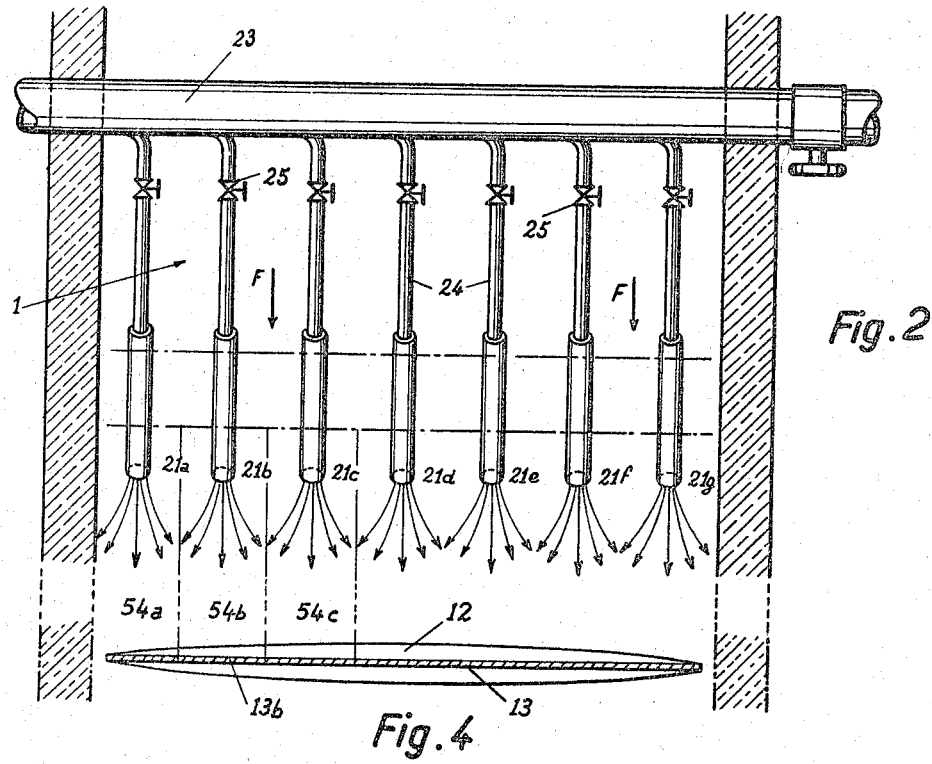
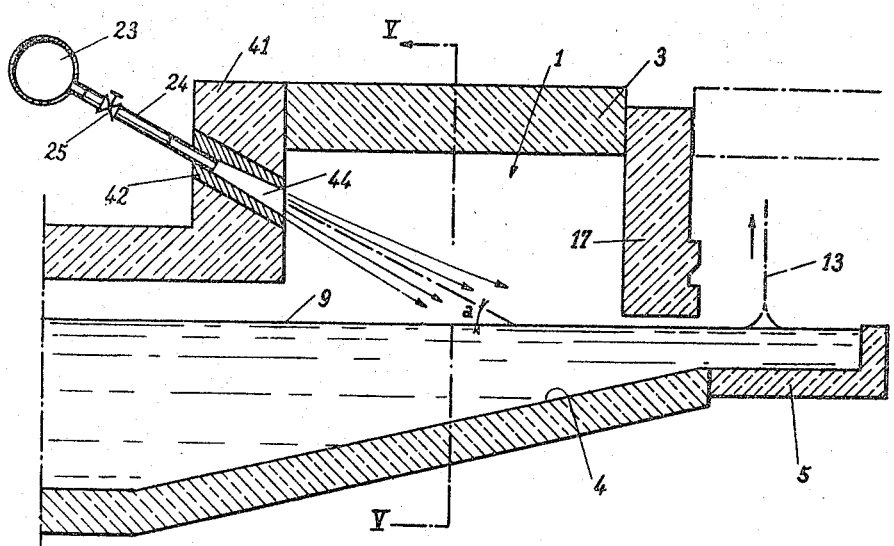

INVENTOR
GEORGES PRISLAN
ATTY.

United States Patent Office 3,317,300
Patented May 2, 1967

3,317,300
ANGULAR JETS IN CONDITIONING CHAMBER OF A GLASS SHEET DRAWING APPARATUS
Georges Prislan, Wingles, Pas-de-Calais, France, assignor to Société dite: Glaces de Boussois, Paris, France, a company
Filed Sept. 12, 1963, Ser. No. 308,587
Claims priority, application France, Sept. 21, 1962, 910,082
5 Claims. (Cl. 65—84)

This invention relates to a process useful in well-known installations for the manufacturing of sheet glass (or window glass). These installations comprise a drawing machine disposed downstream of a thermal conditioning chamber also named "cooling chamber" in the art which is fed with molten glass through a channel communicating with the tank of a continuous furnace.

More particularly, the invention is applicable to the Libbey-Owens process wherein the drawing machine continuously advances a soft glass ribbon which is drawn vertically from the surface of the bath as it progresses towards a bending roll which bends the ribbon horizontally and advances it towards the feeding rolls. These feeding rolls send the ribbon to an annealing leer where it is submitted to an annealing treatment and thereafter to a cooling treatment determined by temperature variations.

Such a process is well-known and widely used. It does, however, have several disadvantages.

First, various defects on the surface of the drawn glass are frequently noted. These defects may be caused partly by the penetration of dust or other particles into the furnace, as well as by defects in the sealing stability of the masonry, particularly in the thermal conditioning chamber. Furthermore, there is a lack of uniformity in the thickness of the drawn glass; this defect is attributed to a non-uniform transverse distribution of the temperatures present in the glass bath.

In order to prevent the aforementioned penetration of dust or other particles into the furnace where it will cause defects in the glass it has been proposed to place the thermal conditioning chamber under pressure by means of blowing air into its interior. In addition, the blowing of air starts the cooling of the surface of the bath for the purpose of transforming the glass to its viscosity desired for drawing. In other words, the blowing of air creates a surface skin layer which is colder than the entire mass of glass.

Several solutions have been proposed for carrying out the blowing operation.

According to one arrangement the air is introduced by means of tubes which run through the longitudinal wall of the thermal conditioning chamber and are disposed in face-to-face relation. This method of blowing, however, was abandoned since it caused a rapid de-vitrification of the bath along the sides of the tank. By de-vitrification there is meant a significant increase in the viscosity of the molten glass resulting from a decrease in temperature and thus rendering the glass unsuitable for convenient drawing operation.

According to a second arrangement a continuous sheet of air is blown by a transverse tube being at a short distance from the surface of the bath. This method has not proven satisfactory either since it causes a significant cooling along the walls of the chamber, exactly where the heat losses by conduction are the strongest. Again, frequent de-vitrifications have resulted.

Finally, it was proposed to blow air from a conduit ending at ceiling level and in the center of the thermal conditioning chamber. This method, however, is not very effective since uncontrolled air currents are created and does not allow a suitable congealing of the surface of the glass bath.

In an attempt to render the temperature of the glass bath uniform as it enters the draw pot and in order to eliminate the harmful effects of the preceding blowing operation, it has also been proposed to heat the glass on the surface by means of electrodes disposed adjacent to the sides of the chamber. This, however, renders the control of the furnace very delicate, the manufacture of the glass is made much more complicated and the quality of the glass may vary by the passage of current.

An important object of the improved process of the present invention is to provide for blowing air under specific conditions into the thermal conditioning chamber, obviating the disadvantages set forth hereinabove; that is, eliminating the risks of de-vitrification without making an auxiliary heating arrangement necessary.

Another object of the invention is to insure the specific modes of cooling of the glass between the thermal conditioning chamber and the drawing or forming chamber.

Still another object of the invention is to improve on an important drawback of the aforementioned Libbey-Owens process, that is, its low hourly yield.

The drawing speed in the Libbey-Owens process cannot be altered at will since there is a correlation between the speed and the thickness of the obtained glass ribbon even by maintaining all other variables constant. Thus, for a predetermined thickness and under usual working conditions the drawing speed of the glass in the Libbey-Owens process is low.

In order to improve on this drawback it has been proposed to step up the cooling at the base portion of the ribbon relative to the usual operating conditions.

In particular, it is possible to increase the number of coolers disposed at each side of the base portion of the ribbon. These coolers consist of tiles disposed parallel to the direction of drawing and traversed by a liquid coolant.

Increasing the viscosity in this manner at the base portion of the ribbon, the thickness thereof tends to increase by maintaining the speed constant. Similarly, a ribbon of equal thickness may be obtained at higher speeds than previously possible.

The gain in speed obtained in this manner, however, is only of short duration because after several days the speed has to be reduced and it will even fall below its usual normal rate.

The action of the coolers progressively affects the deep lying layers of the glass bath: formation of the de-vitrified glass may be observed at the bottom of the pot. It is not possible to eliminate this formation by conventional means. It is necessary, therefore, to subject the glass rapidly to a superheating which is a very burdensome operation.

Also, the use of coolers having a large surface provokes under these conditions an increase of convective air currents in the drawing chamber which results in considerable defects in the surface of the glass (a phenomenon known as "marring"). Thus, the quality of glass obtained by this method is inferior.

For these various reasons it has been recognized that under usual operating conditions, that is, for thicknesses of commercially used glass sheets (usually between 1.7 and 6.7 millimeters), the width of the drawing chamber should be approximately 450 to 500 millimeters, while the height of the coolers should be between 190 and 210 millimeters. The width of the drawing chamber is measured between the opposed front walls of the two lip-tiles placed at each side of the glass ribbon. These dimensions are practically independent of the width of the ribbon.

By virtue of a particular dimensional arrangement of the drawing chamber this invention allows a considerable increase in the drawing speed. This arrangement, on the other hand, is made possible by the manner the air blowing is carried out. The favorable results obtained by this arrangement are considered as unforseeable by the specialists; the results include not only an increase in the drawing speed but also an improvement in the surface quality of the glass sheet.

According to the invention the process which comprises blowing air into the thermal conditioning chamber is principally characterized by the fact that the blowing of air is carried out by means of a series of transversely disposed jets of air, the axes of which are disposed in substantially vertical parallel planes. These air jets are directed towards the glass bath and are inclined in the direction of the molten glass flow through said chamber. The jets of air merge laterally above the surface of the bath and travel as far as the draw pot in a direction coincident with the travel of the glass. Further, according to the invention, the blowing conditions are controlled separately for each jet for the purpose of obtaining a desired uniform thickness of the drawn glass ribbon.

According to a preferred embodiment of the process, the blowing of air is carried out in such a manner that the axes of the air jets are disposed substantially in the same transverse oblique plane.

The invention also proposes to control differentially the emission of air from one side of the thermal conditioning chamber to the other. The emission of air may be lower adjacent to the sides of the chamber than in the central portion in order to insure a uniformity in the temperature of the glass transversely thereof.

The process, according to the invention, thus makes it possible to obtain an important improvement in the quality of the drawn ribbon, particularly as far as the surface condition of the ribbon is concerned.

According to a preferred embodiment of the invention the differential air blowing operation is combined with a subsequent increase of cooling of the glass by means of radiation in the drawing chamber. This method is carried out by enlarging the drawing chamber relative to the dimensions accepted in the vertical drawing processes. This enlargement is combined with the increase of the surface of the coolers. As will become apparent as the specification progresses, by virtue of the possibilities of correction made possible by the differential blowing operation and by the surface cooling thus enhanced, a durable increase in the drawing speed may be obtained.

Other objects and advantages of the invention will become apparent from the following detailed description taken in conjunction with the exemplary and by no means limitative drawings wherein:

FIG. 2 is a schematic plan view of the thermal conditioning chamber and of one part of the drawing chamber;

FIG. 4 is a view similar to FIG. 1 showing another embodiment of the tubes for carrying the cooling air;

Figure 1:
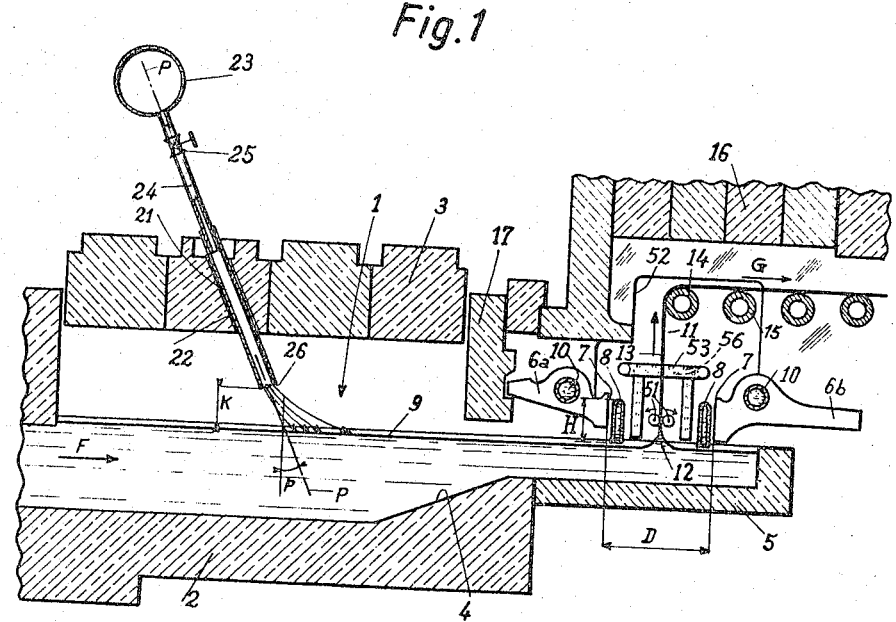
FIG. 1 is a sectional elevation view of a thermal conditioning chamber arranged according to the invention and of a drawing apparatus disposed downstream of this chamber.

The process proposed by the invention will be described hereinafter along with the apparatus which makes such a process possible. An embodiment of the invention is shown in FIG. 1, which illustrates the terminal portion of an apparatus for the continuous manufacturing of sheet glass by vertically drawing the glass ribbon and subsequently bending it for further horizontal feeding. FIG. 1 shows a thermal conditioning chamber 1, the tank 2 of which communicates in an upstream direction with a channel of a continuous furnace (not shown) which insures the continuous feeding of glass in a principal flow F. In this embodiment chamber 1 is of the suspended ceiling type consisting of an assembly of juxtaposed refractory blocks 3.

Downstream of the chamber 1 and beyond an inclined threshold 4 is disposed the draw pot 5 having a horizontal bottom. In the draw pot 5 are disposed lip-tiles 6a and 6b made of refractory silico-aluminous material and suspended on water-cooled transversely extending bars 10—10.

The lip-tiles 6 end in opposed vertical surfaces 7 in front of which there are disposed two hollow transverse and parallel plates or lip-tile coolers 8. These plates, in which cooling water circulates, extend from side to side of draw pot 5. The height H of coolers 8 is, within the framework of the process under consideration, conventionally approximately 200 millimeters. The lower edges of the coolers 8 are disposed in the immediate vicinity of the surface level 9 of the glass bath. The distance D between the front surfaces 7 defines the width of the drawing chamber 11. This dimension is conventionally of the order of 450 millimeters and for all practical purposes does not exceed 500 millimeters.

The glass ribbon is formed in the drawing chamber 11 between the two coolers 8—8. Above an enlargement or meniscus 12 (also called the base of the ribbon) the glass sheet consists of a soft vertical wall 13 which is bent by a bending roll 14 and caused to assume a horizontal direction of travel. The rolls 15 of a conveyor assembly forward this glass ribbon in a direction G toward the annealing leer. The drawing is facilitated by rotary rolls 51—51 pinching the ribbon.

The drawing pot 5 is covered by a refractory ceiling 16, while the separation between the atmospheres of the chamber 1 and the pot 5 is partially insured by means of a curtain of refractory blocks 17 which in the described example also serve as support for the upstream lip-tile 6a.

The side walls of the drawing pot are provided with windows 52 provided with horizontal and vertical perforated tubes 53 (only a portion shown). The perforations 56 of these tubes are disposed in a quinoncial arrangement and are directed outwardly. During operation compressed air is pumped into these tubes for the purpose of producing jets of air directed towards the outside of the drawing pot thereby preventing the penetration of air into the drawing pot through the windows 52.

The organization described so far is well-known and it has been outlined in detail sufficient for a better understanding of the invention which will be hereinafter described.

According to the invention the ceiling of chamber 1 is pierced by an assembly of a blowing tube system comprising in this embodiment a series of tubes 21 preferably of heat-moldable refractory material such as vitreous-silica or quartz. The tubes 21 penetrate the ceiling of chamber 1 by virtue of passages 22 contained for this purpose by the respective refractory blocks.

The tubes 21 are directed towards the surface 9 of the glass and are inclined in the direction corresponding to the direction of travel F of the glass.

Preferably the blowing assembly (FIG. 2) comprises a series of equally spaced tubes 21 made of opaque silica and having axes that lie in a common inclined plane P. The angle p of plane P with respect to the vertical direction may widely vary. This angle is preferably as large as the conditions of mounting the tube would permit (for example, from ten to forty degrees). The larger the angle the less one risks a deformation of the glass surface by otherwise equal force of emission of the air jet.

The number of associated tubes 21 depends upon the width of chamber 1 and it is preferred that it be rather high (five to ten, for example). Each tube 21 is provided with air by a collector 23, and the air passes through metallic conduits 24 each provided with a valve 25 which serves to control the gas emission. The pressurized air pumped into the collector 23 is preferably fresh and filtered so as to be free of any impurities.

According to the embodiment under consideration tubes 21 all have identical diameters (for example, internal diameter 50 millimeters, external diameter 60 millimeters). The tubes are of a circular cross-section and at a constant height K above the surface 9 of the glass bath (for example K equals 200 millimeters plus-minus 50). In case of a channel 3.40 meters wide in chamber 1, a series of seven tubes 21 may be advantageously disposed.

According to an important feature of the invention it is proposed to carry out a differential blowing of the air towards surface 9 of the glass bath by controlling the air emission in tubes 21 by means of valves 25. This control is carried out for the purpose of obtaining a uniform thickness of the drawn glass ribbon 13. This uniformity is controlled along a horizontal line of this ribbon.

It has been proven in practice that for a given average thickness of the drawn ribbon, the thickness of the longitudinal strip of this ribbon formed from the glass that passed under a blowing tube 21 is proportional to the air emission of that respective tube.

Thus, referring once again to FIG. 2, considering the row of tubes 21a, 21b, 21c, if the emission of air is increased in tube 21b an average increase of the thickness in zone 13b of the drawn ribbon is noted. The zone 13b substantially corresponds to glass strip 54b that passed under the tube in question.

It has also been discovered that the variation of thickness obtained in the zone 13b by varying the air exhaust from tube 21b is all the more substantial as the average thickness of the drawn ribbon is larger.

The control of valves 25 is carried out separately in order to remedy the defects of thickness noted in the strip 54: the air emission is decreased in case there is too much thickness, and on the other hand, the emission of air is increased in case the thickness is below the desired value.

In order to carry out this control the following table may be used:

| Average Thickness of the Drawn Ribbon | Increase of Air Emission/hour Producing an Increase of Thickness of 1/10 of a Millimeter |
|---|---|
| 2 to 2.5 mm | 10 m.³ |
| 2.5 to 3.5 mm | 7 m.³ |
| 3.5 to 5 mm | 5 m.³ |
| 5 to 7 mm | 2 m.³ |

It is seen that the margin of control insured by the invention is very wide since a relatively significant variation of air emission causes only a rather small variation of glass thickness, being precisely of the same order of magnitude as the noted defects.

By way of example, a satisfactory operation has been obtained in this exemplary environment with the following control conditions:

Designation of tube 21—a, b, c, d, e, f, g

Emission of air in cubic meters per hour—35, 40, 50, 60, 60, 50, 40

In the above case the glass veins located below tubes 21a, 21b systematically gave a larger thickness to the drawn glass ribbon than the opposite side.

The technical effect obtained by the invention may be explained as follows without tying, however, the invention strictly to the explanation: the air jets only slightly spread and blown at different rates by tubes 21 cause a differential cooling of surface 9 along substantially parallel strips.

In view of the fact that the jets of air merge at the height of the bath, there is no transverse discontinuity of temperature despite the differential cooling. Stated in other terms, the transverse temperature gradient of the glass bath remains small from one side to the other of the channel.

Figure 8:
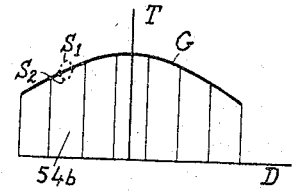
FIG. 8 is an explanatory diagram relating to the process according to the invention.
Figure 7:
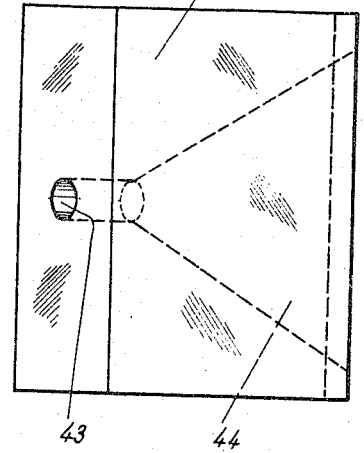
FIG. 7 is a plan view of FIG. 6.

It is exactly the high transverse temperature gradient which causes damaging variations in the thickness of the drawn glass ribbon. If the temperature of the bath is convenient (meaning that it corresponds to parabolic curve G of FIG. 8 where the abscissae D designate the transverse distances across the channel and the ordinates represent the temperatures T), it is possible to distribute the blowing in such a manner as to conserve this temperature curve. On the other hand, if it appears that there is a sudden change of temperature $S_1$ or $S_2$ concerning for example strip 54b, it is possible to eliminate this defect and render temperature curve G uniform again by modifying the air emission blown by tube 21b.

It is considered surprising, nevertheless, that under the conditions set forth by the invention the blowing makes it possible to obtain a uniform distribution of transverse temperatures and does not introduce sudden variations therein.

The following explanation of this fact appears to be plausible:

The jets of air, in addition to uniting laterally and merging at the height of the bath due to the fact that they are being blown from a certain height above the surface of the bath, also travel longitudinally for a significant distance (which may reach 2 meters). The united jets of air travel from the thermal conditioning chamber 1 forward to the base 12 which they lick before passing through window apertures 52 of the drawing machine, expelled by means of the depression created by tubes 53. Another favorable function of tubes 53 is to prevent air from ascending along drawn glass ribbon 13.

This long path of travel of the jets of air makes possible a prolonged action with a progressive attenuation of the differential character of cooling. After the correction of defects in the vicinity of the bath zone located along the axis of tubes 21, such a prolonged action on the glass bath is very favorable for the purpose of maintaining a transverse continuity of the temperatures.

The efficiency of the convective cooling insured by the jets of air is increased by an auxiliary effect of radiation: due to their turbulence the air jets also affect the surface temperature of ceiling 3. The latter, rendered more or less dark, reacts by way of radiation towards the glass bath. This phenomenon has the same function as the one previously described for attenating the transverse discontinuities of temperature.

Finally, it is to be noted that the rapid correction of defects in the thickness of ribbon 13, made possible by the invention, also prevents the phenomena of de-vitrification which after a long-run may appear either in drawing pot 5 or in chamber 1, the localized increase in thickness being considered as a tell-tale of an imminent de-vitrification.

In addition to the irregularity of thickness and the almost complete suppression of the risks of de-vitrification, the invention also makes possible the obtaining of a glass having very good surface qualities.

Figure 3:
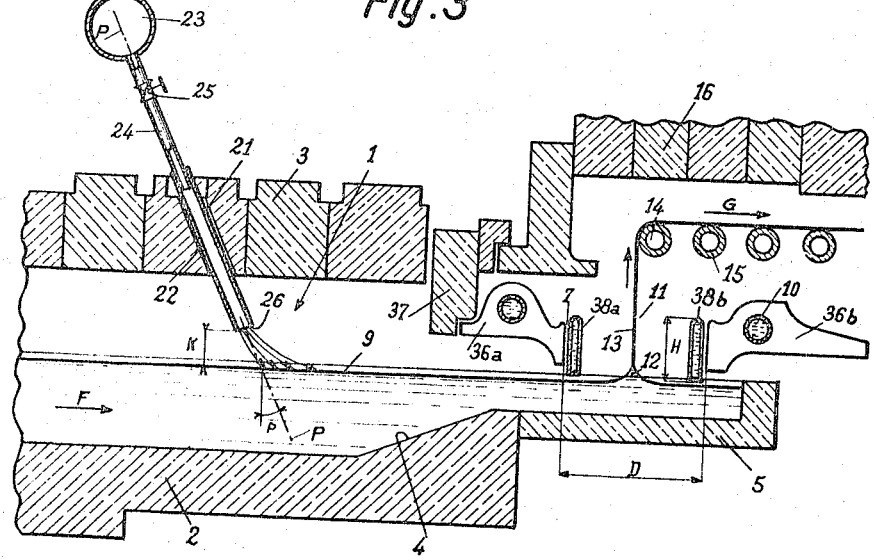
FIG. 3 is a view similar to that of FIG. 1 showing the arrangement of a preferred drawing installation according to the invention.
Figure 5:
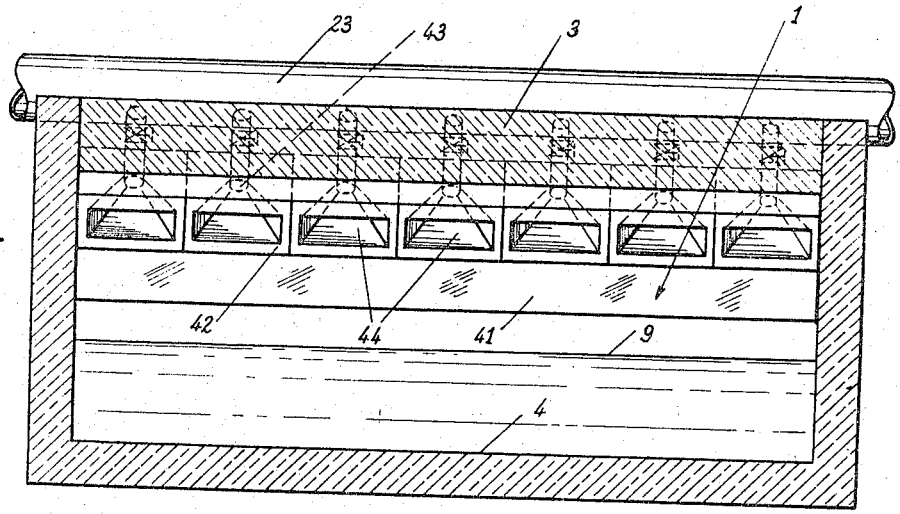
FIG. 5 is a sectional view along line V—V of FIG. 4.
Figure 6:
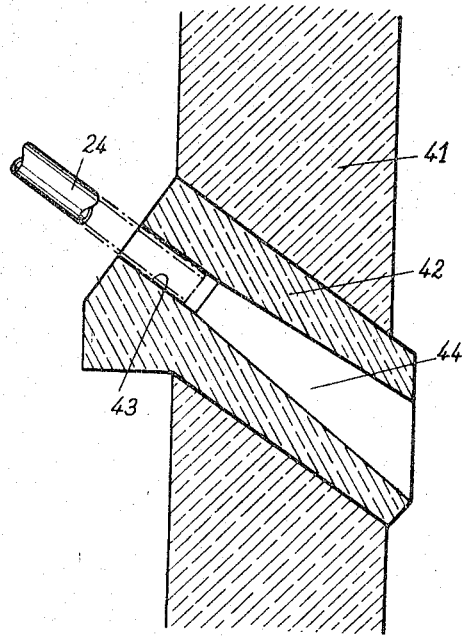
FIG. 6 is an enlarged sectional view of one of the tubes according to FIG. 4.

According to the embodiment of FIG. 3, the thermal conditioning chamber 1 arranged to be adapted for a differential blowing operation is associated with a drawing chamber 11 modified in accordance with the invention for the purpose of insuring a significant increase in the drawing speed. The width D of the chamber 11 is in this embodiment between 550 and 600 millimeters. In view of this modification the lip-tile 36a has been shortened and instead of being supported at its bottom edge by an upstream curtain as shown in FIG. 1, it is now retained by curtain 37.

The increase of speed obtained by this dimentional change of the drawing chamber is particularly surprising upon examining the comparative results given below for a glass thickness between 24 and 28 millimeters, a temperature of 1,050° C. along the axis of the chamber 1 and a temperature of 950° C. at meniscus 12:

| Width D of the Drawing Chamber, cm | 45 | 55 |
|---|---|---|
| Drawing Speed (centimeter per minute) Gain—12%. | 178 | 199 |

It is to be pointed out that without the differential blowing operation the increase of D does not make it possible to obtain commercially useful results in case of thin glass due to the defects in thickness stated hereinbefore. Therefore, the arrangement of the drawing chamber mentioned above can be used only in combination with the differential blowing operation.

According to another embodiment of the invention, it is proposed, furthermore, to substantially increase the height H of coolers 38 to 290 to 310 millimeters. Here, again, a spectacular and unforeseen increase of the drawing speed is obtained both for thin glass and thick glass. This achievement is illustrated by the results below which summarize the increase of speed of 12% mentioned before and the increase due to the modification of the height H of the coolers:

| Thickness of Glass in Tenths of Millimeters | 24 to 28 | 45 to 51 | 53 to 58 |
|---|---|---|---|
| (a) H=20 centimeters, average speed in centimeters per minute | 180 | 80 | 67.5 |
| (b) H=30 cm., average speed in cm. per minute | 214 | 97.5 | 83.7 |
| Gain, percent | 19 | 22 | 24 |

It has been noted that the gain in the drawing speed increases with the thickness of the glass. It is further noted that under these conditions the temperature of the meniscus fell to 940° C.

Thus, the improvements proposed by the invention make it possible to obtain an increase in the drawing speed which varies with the thickness of the glass and which is more than 20% for an average thickness.

It is well understood that the invention is not limited to the embodiments described and that numerous variations are possible in carrying out the differential blowing operation.

Thus, according to the embodiment of FIGS. 4–7, the blowing tubes are installed in the vertical wall 41 upstream chamber 1.

These tubes consist of a series of identical blocks 42 disposed obliquely in wall 41.

Each block 42, which, for example may be made of refractory silico-aluminous material and may be formed by molding operation, is pierced by a central conduit comprising, outside chamber 1, a cylindrical duct 43 ending in a tapered mouth 44 having a pyramidal shape.

Air is fed through pipe 24 provided with control valves similar to that shown in FIG. 1.

The axial planes of the tubes previously described coincide and form, with surface 9 of the glass, an angle $a$ usually between 30 and 40 degrees. The widening of mouths 44 is such that the air sheets, although they are blown in streams separated from the atmosphere of the chamber, merge laterally before arriving at the surface 9 of the bath. The streams of air form a substantial angle with the vertical direction and consequently contact the bath with a reduced kinetic energy. The contact of these streams with the bath is partly due to the higher density of the blown fresh air, which causes the air streams to descend by means of gravity.

I claim:
1. In a process for improving the conditions of continuous vertical drawing of soft glass from a draw pot which is supplied with molten glass from a molten glass bath in a thermal-conditioning chamber and the glass is drawn vertically from the draw pot in a continuous sheet which is then horizontally bent at a distance above the glass bath; the improvement comprising blowing air diagonally downwardly upon said molten glass bath in the thermal-conditioning chamber in a plurality of jets whose axes are inclined in the direction of the draw pot and are disposed in vertical parallel planes with the jets disposed in a series that extends across the thermal-conditioning chamber transversely of the direction of travel of glass toward the draw pot, and blowing less air with the air jets that are adjacent opposite ends of the series of jets than with the middle jets of the series, so that the glass of the surface of the bath is cooled by the jets less at the sides of the thermal-conditioning chamber than in the mid portion of the thermal-conditioning chamber.

2. A process as claimed in claim 1, said jets of air issuing at a point between about 150 and 250 millimeters above the surface of the bath.

3. A process as claimed in claim 1, in which the axes of the air jets are parallel to each other and are disposed substantially in a common oblique transverse plane.

4. A process as claimed in claim 1, in which said axes are disposed at an angle between about 10 and about 40 degrees to the vertical.

5. A process as claimed in claim 1, in which said axes form an angle of about 30 to about 40 degrees with the horizontal.

References Cited by the Examiner

UNITED STATES PATENTS 1,634,802   7/1927   Small et al. _____ 65—204 X

FOREIGN PATENTS 779,779   7/1957   Great Britain.
833,417   4/1960   Great Britain.

DONALL H. SYLVESTER, *Primary Examiner.*

F. W. MIGA, *Assistant Examiner.*